United States Patent Office 3,817,707
Patented June 18, 1974

3,817,707
PROBE HOLDER
Jeffrey Cummings, Stockton-on-Tees, England, assignor to Imperial Chemical Industries Limited, London, England
Filed Feb. 8, 1973, Ser. No. 330,881
Int. Cl. G01n 17/00
U.S. Cl. 23—253 C          1 Claim

ABSTRACT OF THE DISCLOSURE

A test probe holder consists of a hollow tube, externally flared at one end, and a second hollow tube with a corresponding internal flare and making a snug fit around the first tube. The tubes can be relatively rotated so that orifices in their walls are coincident and thereby expose the test probe.

---

Figure 1:
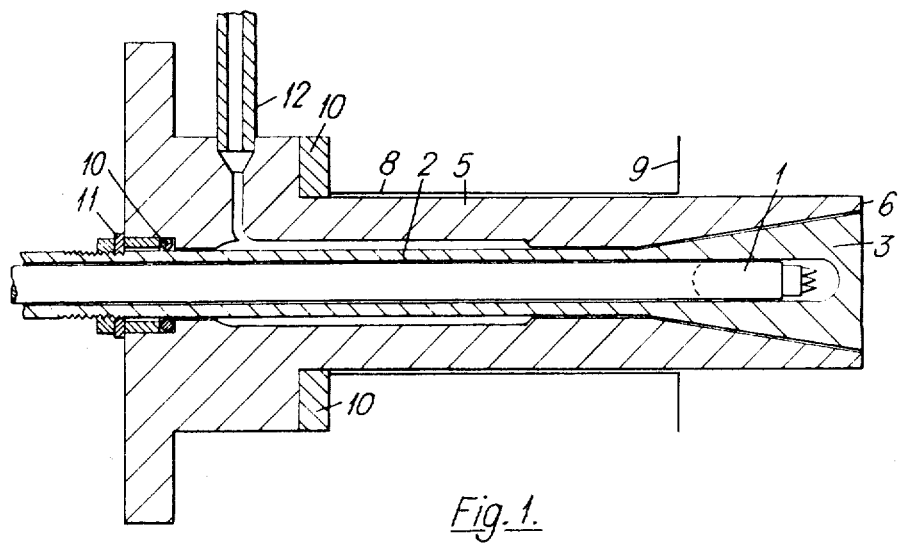

The present invention relates to an improved housing and holder for a probe which has to be inserted into a hostile and/or hazardous environment.

In the chemical process industry, it is frequently necessary to investigate or monitor conditions, for example temperature, pressure, concentration of reactants, in a process, so that, for example, parameters controlling efficient operation of the process may be adjusted to their optimum at the optimum time. In modern plants the process conditions are usually monitored continuously in an "automatic" fashion and without the intervention of a process operator, the conditions usually being indicated to the process operator in a central control room. Occasions also arise where it may be necessary to withdraw samples from process streams by manual means or to investigate manually the conditions in the process reactor or equipment. For example, it is important to be able to gauge the extent of corrosion occurring within process equipment and a common practice has been to insert a test sample into the corroding environment for a predetermined period of time and to then withdraw the sample. The extent of corrosion can then be determined.

Manual monitoring of process conditions or replacement of probes designed to work automatically expose the process operator to certain hazards. The reactants, atmosphere and general conditions in the process equipment may well be very dangerous, for example toxic or inflammable. Sampling, manual monitoring or probe replacement must, therefore, be carried out with extreme care. One method of operation has been to provide a side-arm to a pipe or vessel in which conditions have to be monitored. A probe carrying, for example, an electrode or a corrosion test piece is passed through the side-arm so that the part of the probe used for the measurement projects into the pipe or vessel. Escape of dangerous materials from the pipe or vessel via the side-arm is prevented by making the probe a tight fit within the side-arm. When measurements are completed or when the probe requires replacement, the latter is partially withdrawn down the side-arm to a point just beyond an isolation valve isolating the side-arm from the pipe or vessel. When the isolation valve has been closed, the probe may be withdrawn completely. It has been found, however, that the isolation valve may leak and so when the probe is fully removed the operator may suddenly and unexpectedly be exposed to dangerous gases or liquids. It has been the practice, therefore, to provide a small test-valve in the side-arm on the side of the isolation valve away from the pipe or vessel. When the isolation valve has been closed, the degree of sealing it provides can be gauged by carefully opening the test-valve before the probe is fully withdrawn.

We have now devised an apparatus and method which enables a test probe to be inserted into and withdrawn from a pipe or vessel in a safe manner and which eliminates the need for an isolation valve.

Accordingly, the present invention is a holder for a test probe which comprises:

(a) a first hollow tube flared at one end, the flared end being closed, and which has an orifice in its wall at or adjacent the closed end, (b) a housing making a snug-fit around the first hollow tube and comprising a second hollow tube open at both ends and flared at one end to receive the flare of the first tube, and which has an orifice in its wall adapted to be coincident with the orifice in the first tube when the two tubes are fitted together, and (c) a valve outlet in the wall of the second hollow tube at a position away from the flared end.

In a preferred form of the invention the flared end of the first hollow tube is externally flared and the flared end of the second hollow tube is internally flared.

One method of use of the test probe holder of the invention is to insert it without the test probe, into a side-arm of a pipe or vessel so that its flared end projects into the pipe or vessel. In the absence of the probe itself the first and second hollow tubes are preferably relatively positioned so that their orifices are between 90 and 270° apart. The snug-fit of the housing around the first hollow tube ensures that the holder is gas or liquid-tight. To carry out a test, the probe is inserted into the first hollow tube. The probe is so designed that when it is inserted, its measuring element is in the same plane as the two orifices. With the probe inserted the two tubes are relatively rotated until the two orifices are coincident. The measuring element of the probe is then exposed to conditions in the pipe or vessel. When measurements are complete or the probe requires replacement, the hollow tubes are again relatively rotated until the two orifices are non-coincident. Isolation of the probe from the pipe or vessel atmosphere is then checked by opening a small cock fitted to the valve outlet in the wall of the second hollow tube. If isolation is proved, the probe may be withdrawn.

The apparatus of the invention removes the need for a full bore isolation valve in the side-arm which hitherto has been necessary, but which, as hereinbefore described, has been susceptible to leaks. Removal of this valve enables side-arms of narrower diameter to be used and also makes the apparatus more suitable for use in confined spaces.

Figure 2:
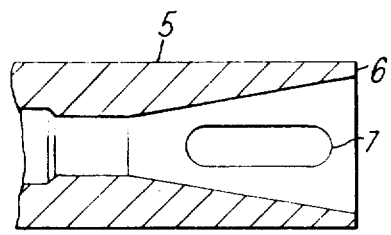
Figure 3:
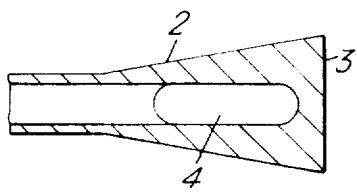

The invention will now be further described with reference to the drawing in which:

FIG. 1 is a longitudinal section of a probe holder containing a probe and is positioned in the side-arm of a vessel, and FIGS. 2 and 3 are details of the flared ends of the first and second tubes of the probe holder shown in FIG. 1 showing the two orifices.

Referring to the drawing a probe 1 is housed as a snug-fit in a first hollow tube 2. Tube 2 is closed at one end 3 and its closed end is flared. An orifice 4 is provided in the wall of tube 2 adjacent the end 3. Surrounding tube 2 is a housing comprising a hollow tube 5 flared at its end 6, which is open. The flared ends of tubes 2 and 5 complement each other so that tube 2 can be inserted into tube 5 as a snug-fit. An orifice 7 is provided in the wall of tube 5 corresponding in size to orifice 4, in tube 2 and adapted to be coincidentally located therewith.

The housing and tube 2 are located in a side-arm 8 of a vessel 9 and project into vessel 9. Gaskets 10 are provided between the side-arm 8 and tube 5. A locking ring 11, of conventional design, is used to locate the probe holder securely in side-arm 8, but at the same time allowing relative rotation of tube 2 within tube 5. An outlet 12 in tube 5 is remote from end 6 and leads to a small cock (not shown).

When there is no probe in the holder, the orifices 4 and 7 are blanked by the walls of tubes 5 and 2 respectively, the orifices being between 90° and 270° apart. When it is desired to make measurements using a probe, the probe 1 is first inserted into tube 2 and locked in position by means not shown. To expose the probe to conditions in vessel 9, tubes 2 and 5 are relatively rotated until orifices 4 and 7 are coincident, thus exposing the probe.

When measurements are complete, the orifices are again blanked off by relative rotation of the tubes. The degree of sealing in tube 5 is then checked using the small cock fitted to outlet 12. If isolation is satisfactory, the probe is withdrawn.

We have found that the apparatus of the invention reduces the hazards attached to inserting and removing a probe, for example a corrosion coupon inserted into a vessel containing gas oil at a temperature of the order of 350° C. At this temperature, gas oil ignites spontaneously on contact with air. The rate of so-called "Dangerous Occurrences," i.e. occurrences arising in which injury could have occurred to an operator has been reduced by use of the apparatus of the invention instead of the conventional apparatus employing a full-bore valve.

What is claimed is:
1. A holder for a test probe comprising
 (a) a first hollow tube flared at one end, the flared end being closed, and which has an orifice in its wall at or adjacent the closed end,
 (b) a housing making a snug-fit around the first hollow tube and comprising a second hollow tube open at both ends and flared at one end to receive the flare of the first tube, and which has an orifice in its wall adapted to be coincident with the orifice in the first tube when the two tubes are fitted together, and
 (c) a valve outlet in the wall of the second hollow tube at a position away from the flared end.

References Cited
UNITED STATES PATENTS

| | | | |
|---|---|---|---|
| 2,864,252 | 12/1958 | Schaschl | 23—253 C |
| 3,014,789 | 12/1961 | Wolber | 23—230 C |
| 3,418,842 | 12/1968 | Schaschl | 73—86 |
| 3,627,493 | 12/1971 | Manley | 23—253 C |

RONALD E. SERWIN, Primary Examiner

U.S. Cl. X.R.

23—259; 73—86

PO-1050
(5/69)

UNITED STATES PATENT OFFICE
CERTIFICATE OF CORRECTION

Patent No. 3,817,707      Dated June 18, 1974

Inventor(s) Jeffrey Cummings

It is certified that error appears in the above-identified patent and that said Letters Patent are hereby corrected as shown below:

In the heading of the patent, add:

--[30]   Foreign Application Priority Data

February 24, 1972   Great Britain ... 8570/72--

Signed and sealed this 29th day of October 1974.

(SEAL)
Attest:

McCOY M. GIBSON JR.
Attesting Officer

C. MARSHALL DANN
Commissioner of Patents